Feb. 5, 1952 M. A. WECKERLY 2,584,949
FLEXURE PLATE WEIGHING SCALE
Filed March 1, 1947 7 Sheets-Sheet 1
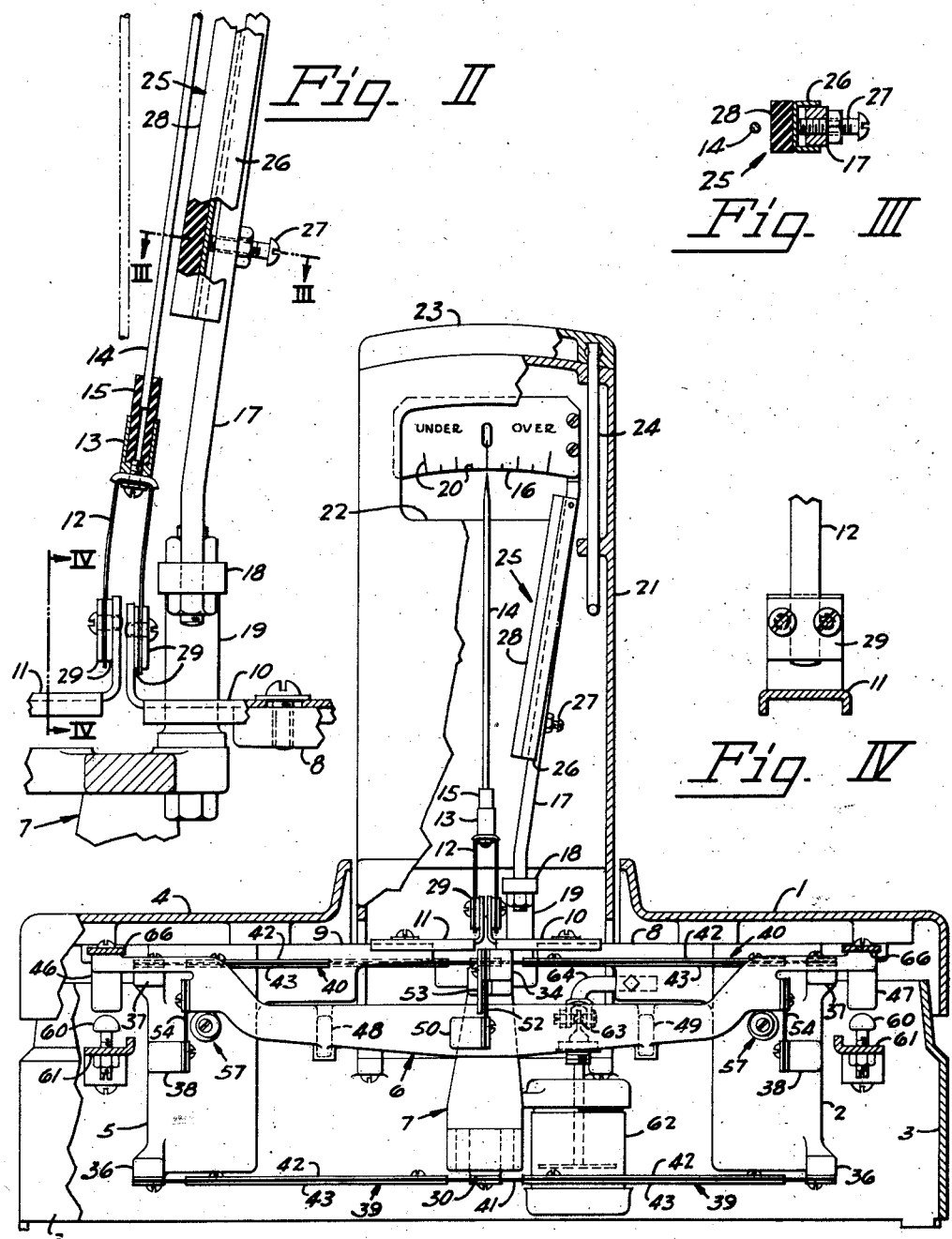
INVENTOR.
Mark A. Weckerly
BY
Marshall and Marshall
ATTORNEYS Feb. 5, 1952 M. A. WECKERLY 2,584,949
FLEXURE PLATE WEIGHING SCALE
Filed March 1, 1947 7 Sheets-Sheet 2
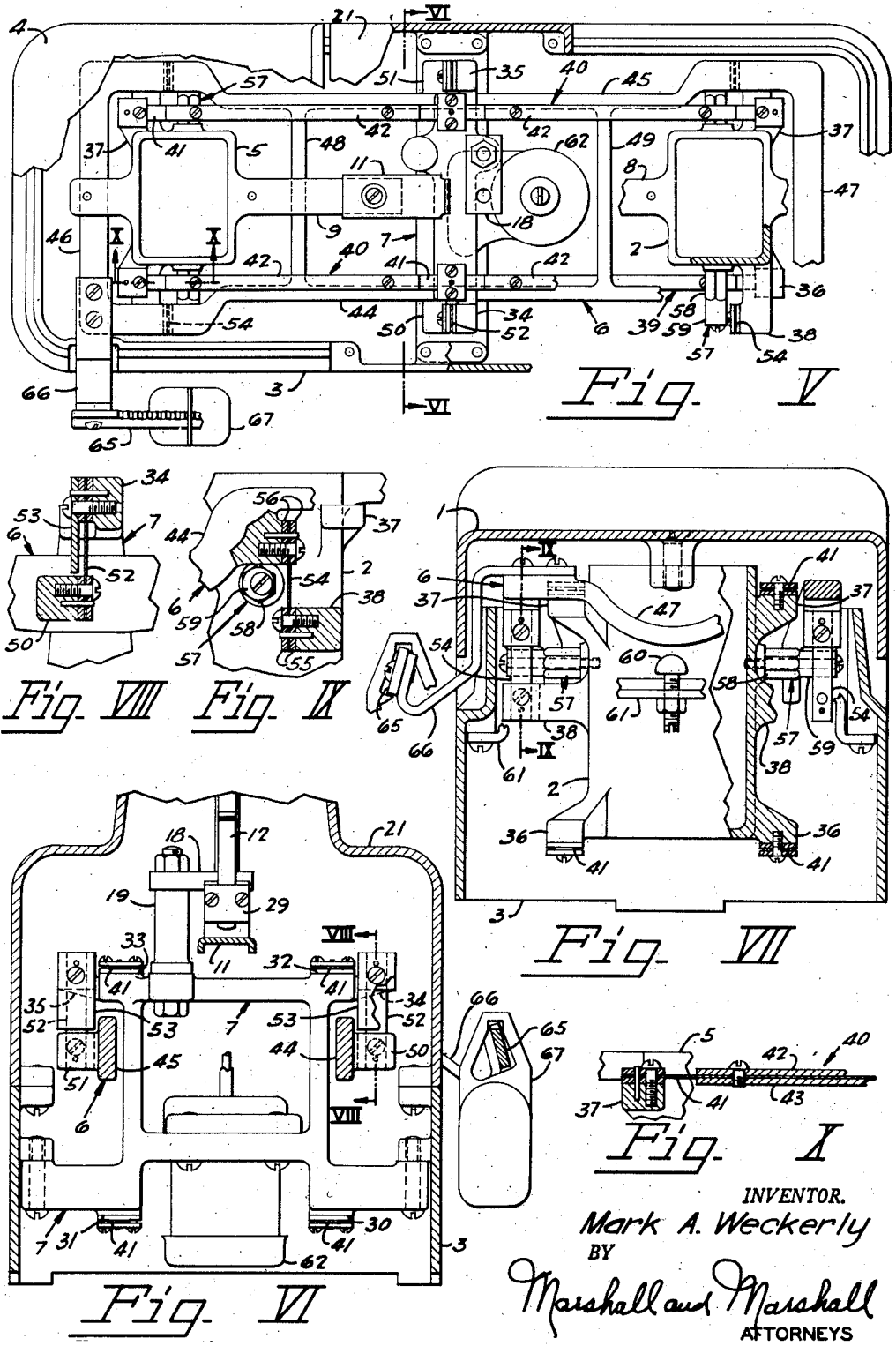
INVENTOR.
Mark A. Weckerly
BY
Marshall and Marshall
ATTORNEYS Feb. 5, 1952 M. A. WECKERLY 2,584,949
FLEXURE PLATE WEIGHING SCALE
Filed March 1, 1947 7 Sheets-Sheet 3
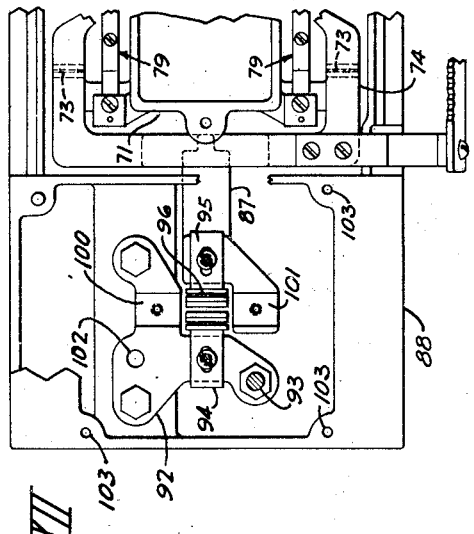
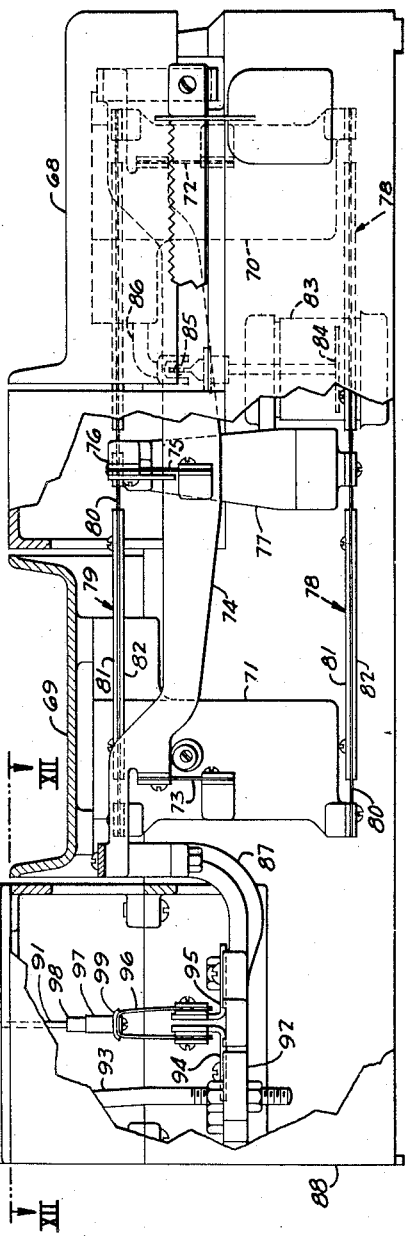
INVENTOR.
Mark A. Weckerly
BY
Marshall and Marshall
ATTORNEYS Feb. 5, 1952     M. A. WECKERLY     2,584,949
FLEXURE PLATE WEIGHING SCALE
Filed March 1, 1947     7 Sheets-Sheet 4
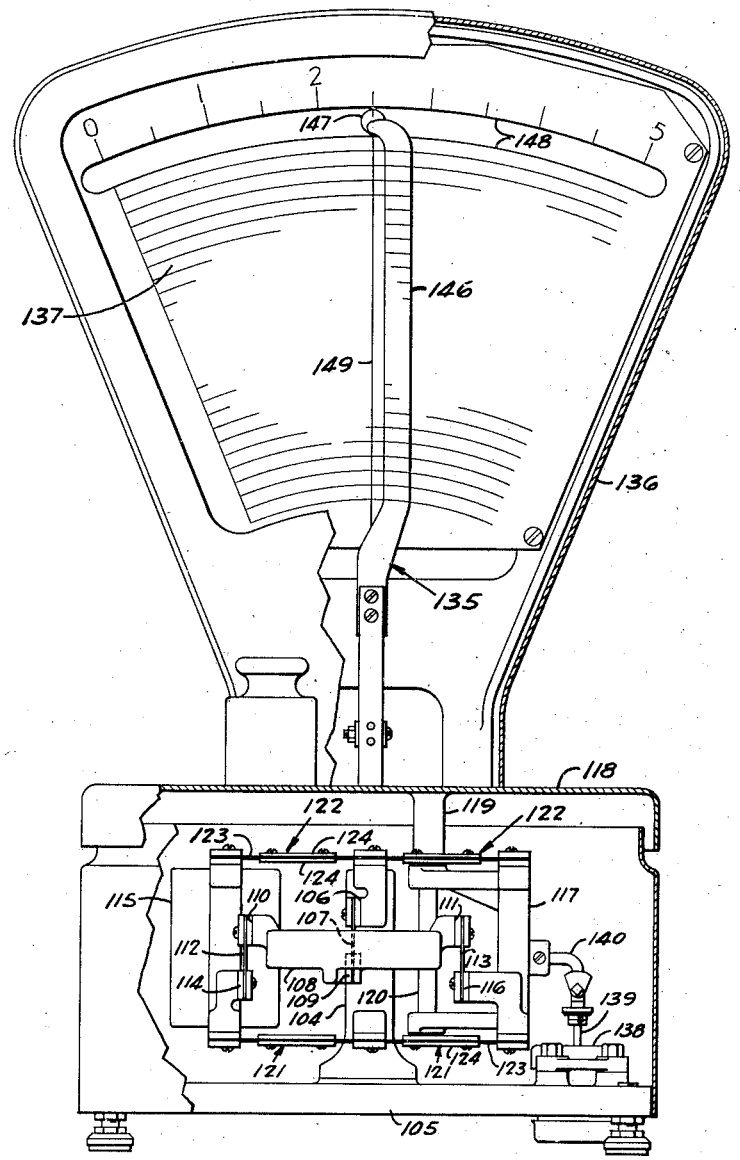
Fig. XIII
INVENTOR.
Mark A. Weckerly
BY
Marshall and Marshall
ATTORNEYS

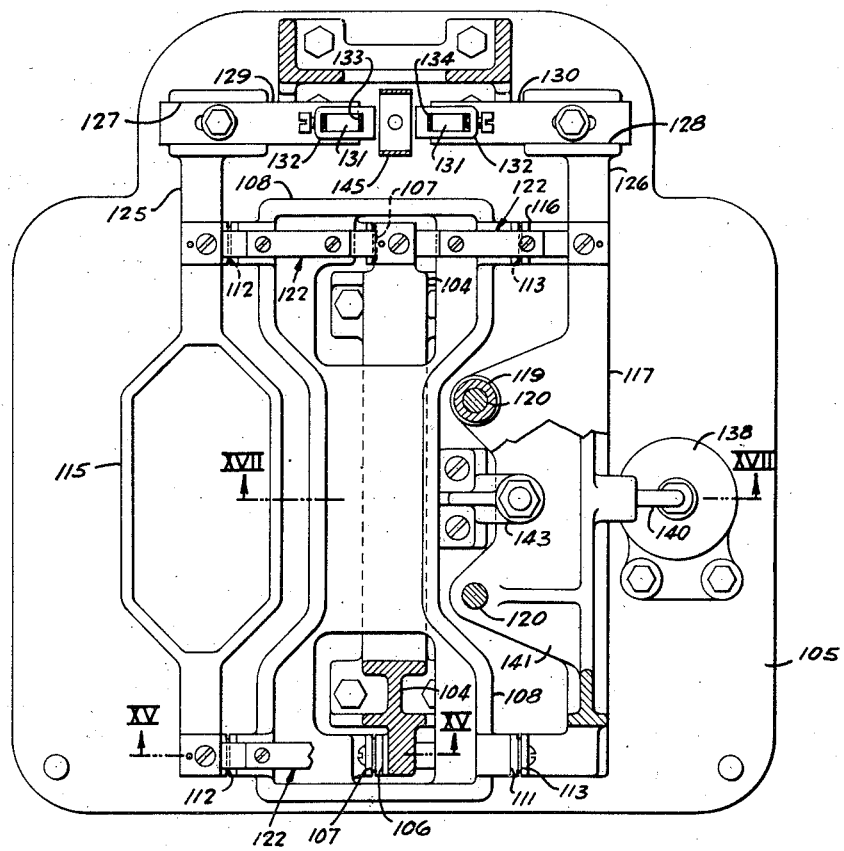

Feb. 5, 1952 M. A. WECKERLY 2,584,949
FLEXURE PLATE WEIGHING SCALE
Filed March 1, 1947 7 Sheets-Sheet 6
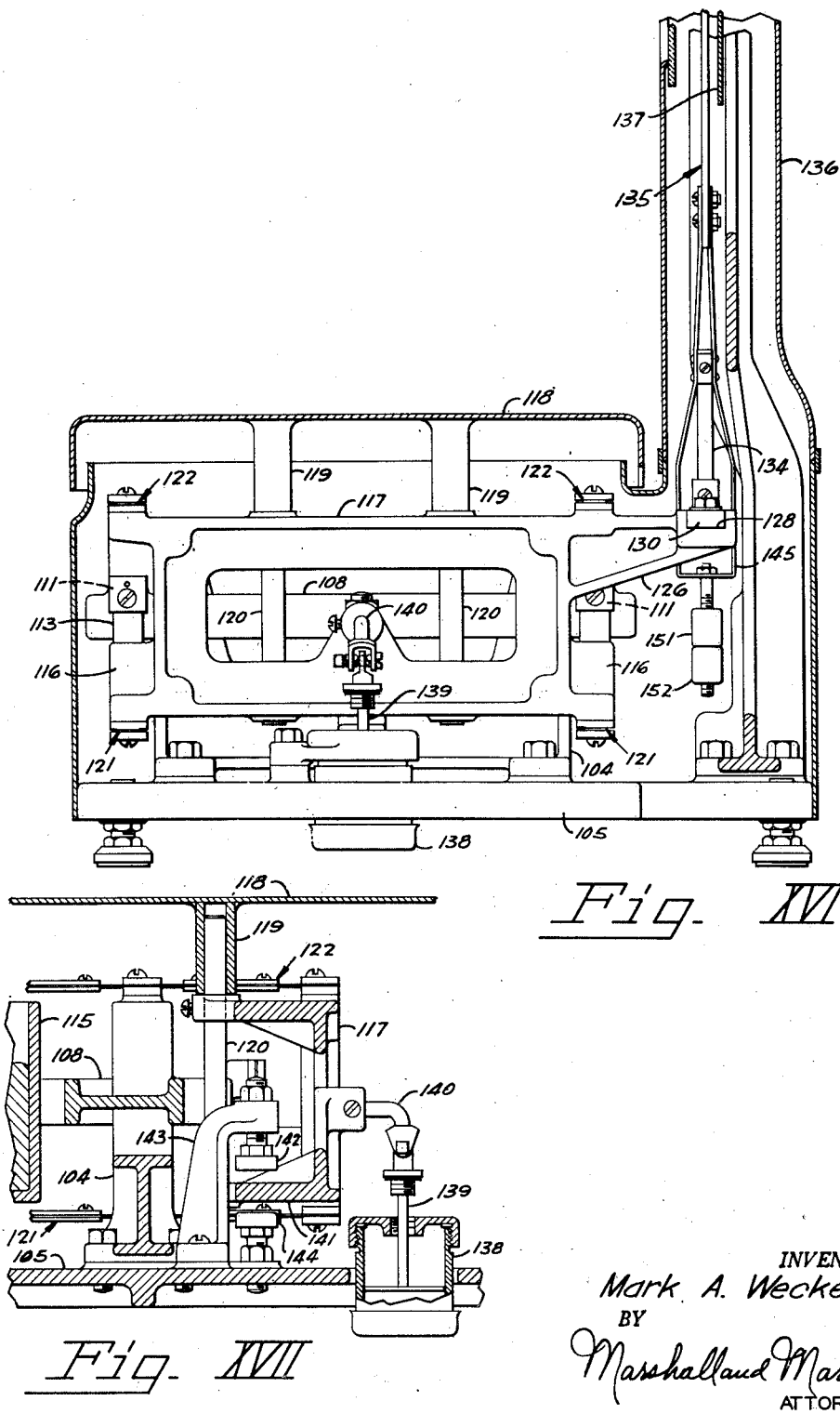
Fig. XVI
Fig. XVII
INVENTOR.
Mark A. Weckerly
BY
Marshall and Marshall
ATTORNEYS

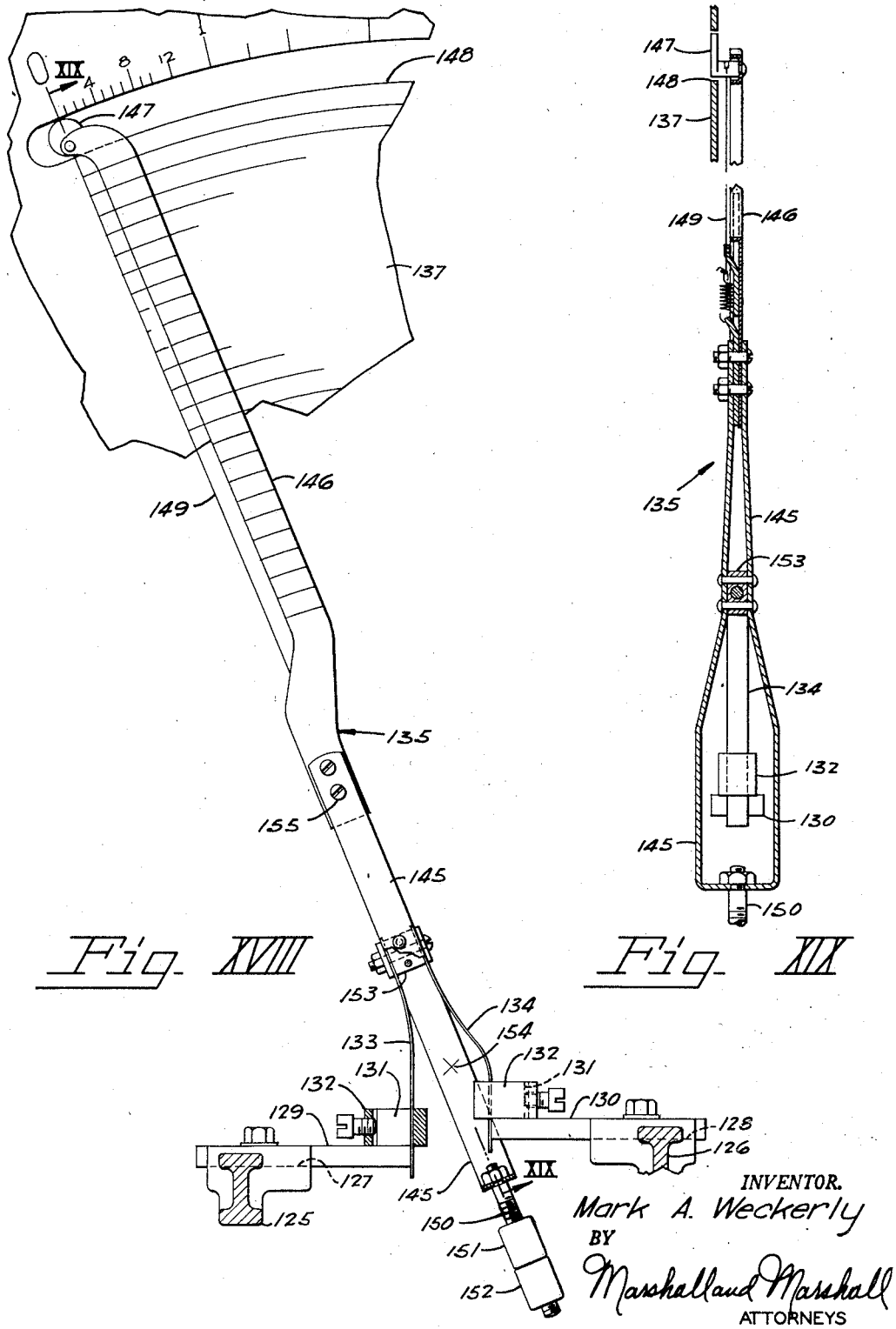

Patented Feb. 5, 1952

2,584,949

UNITED STATES PATENT OFFICE 2,584,949

FLEXURE PLATE WEIGHING SCALE

Mark A. Weckerly, Toledo, Ohio, assignor to Toledo Scale Company, Toledo, Ohio, a corporation of New Jersey Application March 1, 1947, Serial No. 731,751

14 Claims. (Cl. 265—54)

This invention relates to weighing scales and in particular to a weighing scale in which the knife edge pivots are replaced by flexure members.

Weighing scales, particularly small portable scales that are subjected to rough usage, soon lose their accuracy because of the wear that occurs between the knife edges and the bearings on which they rest.

The principal object of this invention is to provide a weighing scale in which no parts are subjected to wear.

An ancillary object is to provide a resilient indicator drive, the resiliency of which prevents injury of the indicator that might result from the suddenly applied load.

The invention consists in a weighing scale having a load receiver connected to a frame and to load counterbalancing means by mechanism including at least one member having flexible end portions attached to the frame and the load receiver for guiding the load receiver along a predetermined path and other members, at least one of which is a lever, connected to the load counterbalancing means, said other members having flexible portions connected to the frame and the load receiver, said flexible portions of said members being oriented some parallel to the lever and others parallel to the path of movement of the load receiver.

The improved weighing scale consists of four principal parts, viz.—a load receiver that includes a platter for receiving articles to be weighed and a spider for supporting the platter, a frame for supporting and housing the weighing mechanism, a load counterbalancing means which includes elements for resisting the load forces and indicating their magnitude, and mechanism for connecting the load receiver to the frame and to the counterbalancing mechanism. The mechanism employs portions flexible in bending in lieu of knife edges and V-bearings.

In order that the weight indication be independent of the position of the load on the load receiver the receiver must be guided to movement along a predetermined path and the path of each point of the load receiver must be exactly similar to the path of every other point. These paths, furthermore, must not be influenced by the magnitude of the load. The path of one portion of the load receiver of the improved weighing scale is determined by at least one member acting as a check link and having flexible end portions connected to the frame and to the load receiver. This member prevents undesired horizontal motion of the receiver without materially impeding its vertical motion. Other members at least one of which is a lever similarly guide another portion of the load receiver and acting with the first member produce a parallel motion for the load receiver thus ensuring that the path of any point of the load receiver is precisely similar to the path of any other point of the load receiver.

The improved weighing scale eliminates all knife edges and bearings from the weighing system, as well as eliminating all delicate relatively movable parts normally associated with the indicator of a scale. Since there is no possibility of sliding movement between any of the parts that guide or support the load receiver, there is no possibility of friction and no possibility of wear between the cooperating parts. Such a structure can only be damaged by overloading it beyond the elastic limit of the flexural members.

By suitably proportioning the elements of the improved weighing scale, the scale may be made to have the sensitivity and stability of a knife edge weighing scale of similar capacity.

The foregoing objects and other advantages incident thereto are attained in a weighing scale embodying the invention. Preferred embodiments of the invention are illustrated in the accompanying drawings.

In the drawings:

Figure I is a front elevation, with parts broken away, of the improved weighing scale.

Figure II is a fragmentary detail at an enlarged scale of the indicator driving mechanism.

Figure III is a cross section taken substantially along the line III—III of Figure II.

Figure IV is a fragmentary elevation taken along the line IV—IV of Figure II.

Figure V is a plan view, with parts broken away and other parts shown in section, of the mechanism of the improved weighing scale.

Figure VI is a transverse section taken substantially along the line VI—VI of Figure V.

Figure VII is an end elevation of the scale mechanism, partly in section and with parts broken away, as seen from the right in Figure V.

Figure VIII is a fragmentary section taken through a fulcrum support substantially along the line VIII—VIII of Figure VI.

Figure IX is a fragmentary detail, partly in section, of a load receiver support as seen from the line IX—IX of Figure VII.

Figure X is a fragmentary sectional view of a check link as seen from the line X—X of Figure V.

Figure XI is a front elevation, with parts broken away and parts shown in section, of another weighing scale embodying the invention, Figure XII is a fragmentary plan view, with parts removed and other parts shown in section, taken generally along the line XII—XII of Figure XI.

Figure XIII is a front elevation, with parts broken away, of still another weighing scale embodying the invention.

Figure XIV is a plan view of the lever system of the weighing scale shown in Figure XIII.

Figure XV is a fragmentary vertical section taken substantially along the line XV—XV of Figure XIV.

Figure XVI is a fragmentary side elevation of the improved weighing scale with the housing broken away to show the operating mechanism.

Figure XVII is a fragmentary vertical section taken substantially along the line XVII—XVII of Figure XIV.

Figure XVIII is an enlarged detail of the indicator used with the improved weighing scale and a fragment of the chart with which the indicator cooperates.

Figure XIX is a fragmentary longitudinal sectional view taken substantially along the line XIX—XIX of Figure XVIII.

In a weighing scale embodying the invention, a load receiver 1 has a depending loading box 2 that extends down into a hollow generally rectangular housing 3. The scale also has a counterweight receiver 4 mounted on a counterweight loading box 5 that also extends into the housing 3. A lever 6, suspended from a bridge member 7 spanning the width of the housing 3 in its central plane, extends longitudinally of the housing with the loading boxes 2 and 5 suspended from the ends of the lever 6. The loading boxes 2 and 5, near their upper ends, have arms 8 and 9 extending toward the center of the scale. At their ends the arms 8 and 9 carry L-shaped brackets 10 and 11 to the up turned ends of which a U-shaped resilient indicator support 12 is attached. The L-shaped brackets 10 and 11 are channel-shaped in their horizontal portions to fit over the arms 8 and 9 extending from the loading boxes and are fashioned so that they may be adjusted longitudinally of the arms 8 and 9 to vary the spacing between their upturned ends.

The resilient U-shaped indicator support 12 has the ends of its legs clamped to the upstanding portions of the L-shaped brackets 10 and 11 and has an upwardly extending ferrule 13 secured to the cross piece or bend between the legs of the U-shaped support. A thin, pointed wand of balsa wood or aluminum tubing serves as an indicator 14, which indicator is mounted into the ferrule 13 by means of a rubber or resilient plastic sleeve 15. The pointed tip of the indicator 14 cooperates with an indicia bearing chart 16 that is mounted at the upper end of an upwardly extending stem 17 which, by means of a bracket 18 and post 19, is supported from the bridge 7. Indicia 20 on the indicia bearing chart 16 cooperate with the indicator 14 to indicate the magnitude of the difference between the loads on the load receiver 1 and the counterweight receiver 4. The indicia bearing chart 16 and the indicator 14 are enclosed within a hollow tower 21 that has a window 22 through which the chart 16 may be observed. A handle 23 connected to the tower 21 by sliding links 24 provides a convenient method of handling the scale for transporting it from place to place while the sliding links 24 permit the handle 23 to lie closely adjacent the top of the tower when it is not in use.

An indicator stop 25 consisting of a long channel-shaped piece 26 straddling the chart supporting stem 17 is pivoted to the stem at its upper end and is adjusted with respect to the stem by a screw 27 threaded through the stem and engaging the lower end of the channel-shaped piece 26. A sponge rubber bumper 28 is secured to the face of the channel-shaped piece 26 for engaging the indicator 14. The screw 27 permits the stop 25 to be adjusted so that the full length of the indicator 14 strikes the stop thereby minimizing the stresses induced in the indicator. It is desirable that the sponge rubber bumper 28 be at least a semiconductor of electricity so that static charges will not accumulate thereon or on the indicator 14. Such charges may result from repeated impacts of the indicator 14 and the electrostatic field produced by such charges may introduce an appreciable error into the indication.

The legs of the U-shaped indicator support 12 are clamped between plates 29 in attaching them to the L-shaped brackets 10 and 11. This construction permits adjustment of the free length of the legs of the U-shaped member and, thus its spring effect in resisting relative movement of the brackets 10 and 11 and the load receivers 1 and 4. Mounting screw holes in the plates 29 are drilled off center so that the plates may be mounted in either of two positions and thus provide two degrees of sensitivity for the scale without requiring duplicate pieces. The longitudinal adjustment of the brackets 10 and 11 on the arms 8 and 9 provide a means for adjusting the linearity of the indicator travel with respect to changes in load.

Referring to Figure VI, the bridge 7 is an open work frame extending transversely of the housing 3. It has two machined surfaces 30 and 31 on its lowermost portion, a pair of machined surfaces 32 and 33 on its top surface and a pair of laterally extending lugs 34 and 35 (Figure V). Referring to Figures I and VII, each of the loading boxes is provided with laterally extending lugs 36, 37 and 38. The lugs each have machined surfaces with the distance between the surfaces of the lugs 36 and 37 being made equal to the distance between the machined surfaces 30 and 32 of the bridge 7. Furthermore, there are two each of the lugs 36, 37 and 38 on each of the loading boxes with the horizontal spacing between the lugs corresponding to the horizontal spacing between the surfaces 30 and 31 or 32 and 33 of the bridge 7.

Referring to Figures I and V, the loading boxes 2 and 5 are constrained to move in a substantially vertical path by a plurality of substantially incompressible, non-stretchable members that are flexible in bending. These members—check links 39 and 40—each consist of a metallic ribbon 41 that extends from one of the lugs 36 or 37 past the bridge 7 to the corresponding lug 36 or 37 on the other loading box. The ribbons 41 are continuous throughout their lengths and are clamped between plates at the lugs 36 or 37 and at the bridge 7. The ribbons are supported from buckling by top and bottom reinforcements 42 and 43, the reinforcements extending along the length of the ribbons but terminating short of the clamping plates to leave a freely flexible portion of the ribbon adjacent each of the clamping plates. A detail of the construction of a check link is illustrated in Figure X.

There are two ribbons 41 connecting the lowermost portions of the loading boxes 2 and 5 together and to the lowermost portion of the bridge 7. These ribbons are in one horizontal plane. There are two similar ribbons arranged in a similar plane that passes through the upper portions of the loading boxes 2 and 5 and the upper surface of the bridge 7. Thus, these latter ribbons are in another plane that is parallel to the first plane. This combination of check link ribbons constrains the movement of each of the load receivers to a single predetermined path.

The lever 6 comprises a pair of spaced side rails 44 and 45 that are connected at each end by cross members 46 and 47 and are braced intermediate the ends by cross ties 48 and 49. The side rails 44 and 45 have laterally extending lugs 50 and 51 near their midpoints. A vertical surface of each of these lugs is machined to receive the lower end of a fulcrum ribbon 52 (see also Figure VIII). The fulcrum ribbons 52, there being one on each side of the scale, are doweled and clamped to the supporting lugs so as to be strong in tension but yet free in bending. A safety stop 53 attached to the lug 34 along with the fulcrum ribbon clamp extends downward toward and almost into contact with the lug 50 to prevent the lever 6 from being lifted sufficiently to kink the fulcrum ribbon.

Referring to Figure IX, the connections between the lever 6 and the loading boxes 2 and 5 consist of load ribbons 54. The lower ends of the load ribbons 54 are clamped between plates 55 and against one of the lugs 38 of a loading box and their upper ends are clamped between plates 56 on machined surfaces of the lever 6 near the ends of the side rails 44 and 45. In order to prevent either of the load receivers from being lifted with respect to the scale in a manner which would cause damage to the load ribbons 54, loading box stops 57 are provided. Each of these stops consists of a stud 58 extending laterally from the loading box 2 or 5 and carrying an eccentric portion 59 which is positioned closely to, but not quite touching the lower surface of the side rails 44 or 45 adjacent the load ribbons 54. Any upward movement of a loading box with respect to the lever 6 therefore brings the eccentric portion 59 of the stop directly into contact with the lever and thereby prevents crumpling or kinking the load ribbons.

The travel of the lever 6 in response to unbalance between loads applied to the load receivers is limited by adjustable stops 60 that are mounted in cross members 61 spanning the space between the sides of the housing 3 near the ends thereof. The stops are set to engage the end cross members 46 and 47 of the lever 6.

Continued oscillation of the weighing mechanism in response to a change in load is prevented by a hydraulic dash pot 62, the plunger of which is connected through a ball and socket joint 63 to a goose-necked bracket 64 extending from a portion of the loading box 2.

A tare beam 65 is carried on formed extension brackets 66 extending forward from each end of the lever 6 and projecting outside of the housing 3 beneath the load receiver 1 and counterweight receiver 4. The tare beam 65 carries a poise 67 that may be used to off-set part of the load on the load receiver.

In order that a weighing scale employing flexural members as substitutes for knife edge pivots and bearings shall be sensitive and accurate, certain precautions with respect to construction and geometry must be observed. The first requirement that is satisfied in the improved weighing scale is that the load receiver and the counterweight receiver shall be constrained to move along predetermined paths regardless of the load that is placed on the load receiver. The improved weighing scale satisfies this condition because the flexure plate check links 39 and 40 prevent any lateral motion of the load receiver and any longitudinal motion parallel to the lever as well as rotation about a vertical axis or a horizontal axis that is transverse to the lever. The width of the lever and its two-point fulcrum suspension and two-point connection to each of the load receivers prevents any rotation about an axis parallel to the lever. The only remaining motion available to the load receiver is motion along a vertical arc determined by the length of the check links. By constraining the motion of the load receiver in this manner there is no possiblity for accidental stress or deformations of the fulcrum ribbon or load ribbon to introduce moments which vary with load into the weighing system.

A second requirement that must be satisfied in order that the weighing scale may have the same sensitivity at no load and at full load, i. e. that the increments of weight represented by the indicia 20 shall be independent of the total load, is that the points at which the supporting ribbons, the fulcrum ribbons 52 and the load ribbons 54 meet the lever 6 shall be very definitely located. Substantially constant sensitivity is attained if each of the supporting ribbons extends through a reference line corresponding to the pivot line of an ordinary lever and if the edges of the clamping plates clamp the ribbons at a small distance from the equivalent pivot line. Preferably the clamping plates of the lever 6 are adjacent the equivalent pivot line. This means that a line drawn below the lugs to which the upper ends of the load ribbons 54 are attached will pass slightly above the lug 50 to which the fulcrum ribbon 52 is attached. In a weighing scale in which the ribbons each had a free length of one-half inch the equivalent pivot line passed at a distance of about one-sixteenth of an inch from the lug 50 and from the clamping plates at the upper ends of the load ribbons 54. The tare beam brackets 66 are designed so that the upper edge of the tare beam from which the poise 67 depends shall be parallel to the equivalent pivot line. This relationship gives a sensitivity that is independent of load.

It is also possible to get constant sensitivity if an equivalent pivot line for the lever passes close to the upper surfaces of the loading box lugs 38 and just below the fulcrum supporting lugs 34 and 35. This latter construction gives a lever which appears to be highly unstable, but which, because of the constraint applied to the motion of the load receivers, nevertheless provides substantially constant sensitivity.

It is not necessary that the indicating mechanism of the improved weighing scale be located intermediate the load receivers. Figure XI illustrates a weighing scale embodying the invention in which the indicating mechanism is located at one end of the housing. In this embodiment of the invention a load receiver 68 and a counterweight receiver 69 are mounted on spiders 70 and 71 respectively. The spiders 70 and 71 are supported by load ribbons 72 and 73 from a lever 74 that, in turn, is pivotally suspended by means of fulcrum ribbons 75 that are attached to lugs 76 forming parts of a fulcrum stand 77. The spiders 70 and 71 are constrained to move in predetermined paths by a plurality of flexural check links 78 and 79. The check links 78 and 79 each consist of a metallic ribbon 80 that extends from one of the spiders 70 or 71 past the fulcrum support 77 to the other of the spiders. The ribbons 80 are supported against failure in compression by reinforcing plates 81 and 82 that are clamped to the upper and lower surfaces of the ribbon 80. The reinforcing plates 81 and 82 are shorter than the spacing between the spiders 70 or 71 and the fulcrum support 77 so as to leave unsupported portions of the ribbon that may flex in bending to accommodate movement of the spiders and load receivers.

A dash pot 83 mounted in the frame of the scale contains a plunger 84 the stem of which is pivotally connected by a ball and socket joint 85 to an arm 86 extending from the load receiver spider 70. The dash pot 83 serves to suppress continued oscillation of the weighing mechanism following a change in load.

A lever arm 87 extending longitudinally from one end of the lever 74 is located within that portion of a scale housing 88 that is immediately below a hollow indicator tower 89. The tower 89 houses an indicia bearing chart 90 and an indicator 91 that cooperates therewith to indicate the condition of balance between the loads on the load receivers 68 and 69.

A three armed bracket 92 (see also Figure XII) is supported in a horizontal plane within the housing 88. One arm of the bracket 92 is drilled to receive a stem 93 that, extending upwardly within the hollow tower 89, carries the indicia bearing chart 90. The bracket 92 and the end of the lever arm 87 are channeled in their upper surfaces to receive the horizontal portions of L-shaped brackets 94 and 95. The upstanding portions of the L-shaped brackets 94 and 95 serve as supports for a U-shaped resilient member 96 that provides a counterforce tending to hold the lever 74 in its horizontal position. A ferrule 97 is secured to the cross member of the U-shaped resilient member 96. The indicator 91, which may be a wand of balsawood or aluminum tubing, has its lower end molded into a rubber or plastic bushing 98 that is set into the ferrule 97. A piece 99 formed to the contour of the cross portion of the U-shaped resilient member 96 supports the highly stressed portions of the resilient member to prevent its fracture under repeated loading.

Any relative movement of the load receivers 68 and 69 and corresponding movement of the lever 74 changes the relative elevation of the lever arm 87 with respect to the bracket 92 and thereby raises or lowers one leg of the U-shaped resilient member 96 with respect to the other leg so that the resilient member is deformed sideways and the indicator 91 is driven along the chart 90.

This indicator drive differs from that shown in the first embodiment of the invention in that one side of the resilient U-shaped member is connected to a piece rigidly mounted with respect to the housing of the scale, while the other leg is attached to the lever. In the first embodiment the legs of the U-shaped resilient member were connected to laterally extending extensions of the weight receiver spiders. The indicator travel for a given movement of the load receiver is approximately the same because the end of the lever arm 87 travels through a distance substantially twice as great as the travel of one of the load receivers.

It is not necessary that the indicator movement be in a plane parallel to the long axis of the weighing scale because the indicator structure including the hollow tower 89 is symmetrical about a vertical axis taken through the neutral position of the indicator 91. To assemble the indicating portion of the improved scale for cross indication the L-shaped bracket 94 is mounted in a transverse channel 100 cut in the three armed bracket 92 while the other L-shaped bracket 95 is mounted in a transverse channel 101 cut in the upper surface of the arm 87. The channels 100 and 101 are in line when the lever 74 is in its neutral position. The indicator chart 90 is shifted for cross indication by mounting the stem 93 through a second hole 102 of the three arm bracket 92. Holes 103 for the screws that hold the hollow tower 89 to the base 88 are located at the corners of a square so that, regardless of whether side indication or cross indication is desired, the same screw holes are employed.

This second example of a weighing scale embodying the invention has all the desirable features of ruggedness and sensitivity that characterize the first example. Like the first example this embodiment has no parts to wear out and no points at which friction may develop through normal use.

A third example of a weighing scale embodying the invention is illustrated in Figures XIII to XIX inclusive. This third example illustrates the improved lever system adapted for use in a fan scale of the type suitable for use in retail stores. In this example a fulcrum stand 104 erected from a base 105 is provided with machined lugs 106 to which fulcrum ribbons 107 are attached. A lever 108 is provided with lugs 109 to which the fulcrum ribbons 107 are attached. The ends of the lever 108 are machined to provide vertical surfaces 110 and 111 to which load ribbons 112 and 113 are attached. The load ribbons 112 are connected to lugs 114 of a counterweight loading box 115. The load ribbons 113 at the other end of the lever 108 are attached to lugs 116 of a spider 117. The spider 117 serves as a support for a platter or load receiver 118, the load receiver having depending bored bosses 119 that telescopically engage posts 120 extending upwardly from the spider 117. As in the preceding examples the lever 108 has an equivalent pivot line that passes slightly below the upper attachment points of the load ribbons 112 and 113 and slightly above the attachment point of the fulcrum ribbon 107 to the lug 109 of the lever 108. This proportioning of the lever 108 provides substantially sensitivity for various loads.

The counterweight receiver 115 and the load receiver spider 117 are guided along substantially vertical predetermined paths by means of horizontal flexural stays 121 and 122. The stays 121 and 122 each consist of a metallic ribbon 123 that extends from and is attached to machined surfaces of the counterweight receiver 115 and at its other end is attached to a similarly machined surface of the spider 117. The midpoint of the ribbon 123 is secured to a machined surface of the fulcrum stand 104. As in the preceding examples reinforcement plates 124 are applied to each of the ribbons 123 to prevent their failure under compressive force.

Referring to Figure XIV the lever 108 is substantially wider than it is long (the length of the lever is its dimension measured between the counterweight receiver and the load receiver spider) and the system of ribbon supports is duplicated at each side of the lever.

Referring to Figures XIV and XVI the counterweight receiver 115 and the spider 117 are provided with arms 125 and 126 the terminal ends of which, in their upper surfaces, are provided with cross grooves 127 and 128 in which arms 129 and 130 are adjustably mounted. Each of the arms has an upwardly extending rectangular tenon 131 on which a clamp 132 is mounted. The clamps 132 serve to secure indicator supporting springs 133 and 134 to the arms 129 and 130. The indicator springs 133 and 134 serve to support an indicator 135 that extends upwardly within a fan-shaped housing 136 and that cooperates with indicia on a chart 137 to indicate the weight of a load and the cost of the load computed according to certain fixed prices. The cost indicia are arranged along a series of arcs on the face of the chart 137.

Continued oscillation of the weighing scale and indicator is controlled by a dash pot 138 that has its plunger 139 pivotally connected to an arm 140 extending from the load receiver spider 117.

The spider 117 (Figure XVII) is provided with a horizontal flange or web 141 that cooperates with an upper adjustable stop 142 mounted from an arm 143 extending upwardly from the base 105 and with a lower stop 144 mounted in the base 105 to limit the travel of the spider 117 in response to changes in load.

Referring to Figures XVIII and XIX the indicator 135 is a composite structure that includes a long slender stirrup-shaped portion 145 to the upper portion of which a long lightweight channel-shaped extension 146 is attached. The upper end of the channel-shaped extension 146 carries an indicator button 147 that travels along a slot 148 of the chart 137. The button 147 is visible from either side of the chart so that weight indications may be had from either side of the fan-shaped housing 136. The indicator 135 is provided with a stretched index cord 149 that cooperates with the computed amount indicia inscribed on the face of the chart 137. The prices corresponding to each of the rows of amount indicia may be printed on the surface of the channel-shaped extension 146 of the indicator.

The lower end of the stirrup-shaped portion 145 is provided with a downwardly extending stem 150 on which stem balance weights 151 and 152 are adjustably threaded.

The indicator springs 133 and 134 are attached to a block 153 that serves as a spreader between the sides of the stirrup-shaped portion 145 and is securely riveted thereto.

Unbalance between the weight of the load receiver 118 and its supporting spider 117 and the counterweight receiver 115 causes relative vertical movement of the receivers and of the arms 129 and 130 which movement is applied by means of the indicator springs 133 and 134 to the spacer block 153 and thus serves to drive the indicator 135 across the chart 137. The load in the counterweight receiver 115 is adjusted so that with a half capacity load on the load receiver 118 the indicator springs 133, 134 are equally stressed and the lever 108 is level. Any removal of load from the load receiver 118 allows the counterweight receiver load to predominate and thus drive the indicator toward the zero end of the chart until, with all load removed from the load receiver, the indicator stands in the position shown in Figure XVIII. Addition of load to the load receiver causes the parts to be deflected in the opposite direction so that the indicator approaches the full capacity end of the chart.

It is desirable for commercial success of an automatic weighing scale that the graduations shall be substantially equally spaced throughout the indicator travel. This condition is achieved in this third example of a weighing scale by adjustment of the indicator counterbalance weights 151 and 152, the length of the indicator springs 133 and 134 and the spacing between the bottom ends of the indicator springs as determined by the positions of the cross arms 129 and 130 with respect to the arms 125 and 126 extending from the counterweight receiver and the load receiver spider. The spacing between the lower ends of the springs 133 and 134 is used to adjust the sensitivity of the scale, that is, to cause it to indicate correctly at zero, half and full load. Slight adjustment to secure correct indication at zero, half and full load is obtained by shortening or lengthening one of the indicator springs depending upon the sign of the error, i. e. whether the error is plus or minus.

The linearity of indicator travel as it affects the indication at one-fourth of capacity and at three-fourths of capacity is determined by the length of the indicator springs 133 and 134 combined with the spacing between their lower ends. Thus if the springs are too long the scale tends to be too sensitive near half capacity and not sensitive enough near the ends of the chart. This condition is corrected by shortening both springs and moving their lower ends toward each other. This combination of adjustments along with the adjustment of the indicator balance weights permits the scale to be adjusted so that it weighs correctly at five points of a substantially evenly graduated chart and furthermore gives correct indications even though the scale be tipped out of level.

In the first two examples the indicator was very light in comparison with the mass of the lever and load receivers. This lightness in combination with the rubber bushing used to mount the indicator into the ferrule on the resilient U-shaped counter force spring serves to dampen the vibration of the indicator following sudden load application sufficiently so that the indicator will come to rest within a fraction of a second. In this third example the weight of the indicator is much greater and its moment of inertia is also large so that some other method of damping must be employed to secure satisfactory or even acceptable indicator action.

The indicator illustrated in Figures XVIII and XIX when combined with the lever system shown in Figures XIII to XVII has two distinct modes of vibration which may be easily excited if the dash pot 138 is disconnected. In the first mode of vibration, which occurs at a relatively low frequency in the neighborhood of two cycles per second, the indicator appears to oscillate about a point 154 which approximates its center of gravity. In this mode of vibration the indicator moves to the right, i. e. toward full capacity while the load receiver 118 is moving downwardly.

A second mode of vibration at a higher frequency also may be excited. In this second mode of vibration the indicator appears to oscillate about a center in the neighborhood of screws 155 that joint the stirrup-shaped portion 145 to the indicator extension portion 146. In this mode of vibration, which occurs at a substantially higher frequency preferably about three times the frequency of the first mode, the indicator tip moves toward the full scale end of the chart while the load receiver 118 is moving upwardly.

These two modes of vibration, the only ones that are noticeable if the indicator is stiff against transverse deflections, may be excited separately or in combination. Since each mode of vibration involves movement of the load receiver spider 117 the dash pot 138 is effective in extracting vibrational energy to bring the system to rest. Thus the coupling between the indicator and the load receiver spider serves to control the vibration of the indicator.

When a load is suddenly applied to the load receiver 118 the resulting movement of the indicator is a combination of the two modes of vibration, each of which is damped by the action of the dash pot. If the moment of inertia of the indicator is selected so that the ratio of frequencies is approximately 3 to 1 the indicator tip apparently stands still while the lower end of the indicator is deflected laterally during a small fraction of a second after the load is applied. The energy stored by lateral deflection is then converted into a rapid movement of the indicator tip, the velocity being the sum of the components contributed by the two modes of vibrations. At a slightly later point in time the higher frequency vibration gains a half cycle on the low frequency vibration so that the two components cancel, thus bringing the indicator tip substantially to rest even though the lower end of the indicator may still be moving. By this time the low frequency vibration has practically disappeared and the remaining energy in the high frequency mode of vibration then quickly moves the indicator forward to indicate the actual load on the load receiver.

This combination of an indicator having a weight and a moment of inertia which when combined with the mass of the counterweight and load receivers gives two natural oscillatory frequencies or modes of vibration that are related by a frequency ratio of approximately 3 to 1 gives an indicator action that is not only very fast but also very free from continued vibration.

These improved weighing scales have no parts to wear out, have no parts that are subject to frictional sliding movement and have no parts that may be damaged by sudden loading or by repeatedly jarring the scales. The combination of features provides weighing scales that may be manufactured of corrosion-resistant materials and that have no close clearances at any point where dirt could lodge and cause an error in indication.

Various modifications and changes may be made to adapt the improved weighing mechanism to specific uses without departing from the spirit and scope of the invention.

Having described the invention, I claim:

1. In a weighing scale, in combination, a frame, a load receiving member, a member pivotally mounted from the frame for supporting the load receiver, load counterbalancing mechanism connected to the pivotally supported member, a U shaped resilient element supported at least in part from one of said members, a socket mounted on the U-shaped member, a resilient bushing in the socket and an indicator having one end set in the bushing and having its other end cooperating with a chart, said indicator being driven along the chart by differential vertical movement applied to the legs of the U-shaped element by movement of the load receiver supporting member.

2. In a weighing scale, in combination, a frame member, a load receiver member, a counterweight receiver, a pivotally mounted member supported from the frame for supporting the load receiver member and the counterweight receiver member, said members undergoing relative movement with respect to each other with changes in load, a U-shaped resilient member having its legs attached one to each of two of the members such that its legs partake differentially of the relative movement accompanying changes in load, a socket mounted on the U-shaped member, a resilient bushing mounted in the socket, and an indicator having one end set in the bushing of the U-shaped member, whereby the indicator is protected from shock as it is swept over a chart by deflection of the U-shaped member resulting from relative movement of its legs.

3. In a weighing scale, in combination, a frame, a load receiver, a counterweight receiver, a lever pivotally supported from the frame and serving to support the load and counterweight receivers, an arm extending from each of the receivers with the ends of the arms adjacent each other, a U-shaped resilient member having its ends attached one to each of the arms, a socket set on the U-shaped member, a resilient bushing set in the socket, and an indicator extending from the bushing of the U-shaped member.

4. In a weighing scale, in combination, a frame, a load receiver, a lever pivotally supported from the frame and supporting the load receiver, load counterbalancing mechanism connected to the lever, a U-shaped resilient member having one of its legs attached to the lever and one to the frame, a socket attached to the crosspiece of the U-shaped member, a resilient bushing in the socket, and an indicator set in and extending from the bushing.

5. In a weighing scale, in combination, a frame, a load receiver, a load counterbalance receiver, a lever pivotally mounted from the frame for supporting the receivers, an indicator driving mechanism including two members that are relatively moved by movement of the receivers, a U-shaped resilient member for supporting an indicator, and brackets for attaching the U-shaped resilient member to the relatively movable members, means on each of said relatively movable members that define a first mounting position for the brackets at which the path of the indicator is parallel to the lever and a second position at which the path of the indicator is transverse to the lever.

6. In a weighing scale, in combination, a frame, a load receiver, a load counterbalance receiver, a lever pivotally mounted from the frame for supporting the receivers, an indicator driving mechanism including two members that are relatively moved by movement of the receivers, a U-shaped resilient member for supporting an indicator, said U-shaped resilient member having its legs mounted from said relatively movable members, means on each of said relatively movable members that define a first mounting position for the U-shaped resilient member at which the path of the indicator is parallel to the lever and a second position at which the path is transverse to the lever.

7. In a weighing scale, in combination, a frame, a lever, a load receiver, a vertically positioned flexible member having its upper end attached to the lever and its lower end attached to the load receiver for supporting the weight of the load receiver, and a plurality of check links that are connected to the frame and to the load receiver, said check links being disposed generally parallel to the lever with some at one and some at another elevation with respect to the lever, said check links cooperating with the frame and load receiver to form a parallelogram for guiding the load receiver in a generally vertical path while it is supported by the vertical flexible member.

8. In a weighing scale, in combination, a frame, a lever, a load receiver, a plurality of check links each having flexible end portions connected to the frame and load receiver and forming a parallelogram for holding the load receiver to a fixed generally vertical path, and a flexible tension member having an upper end attached to the lever and a lower end attached to the load receiver for supporting the load receiver.

9. In a weighing scale, in combination, a frame, a load receiver and a counterweight receiver, a lever, a vertically directed flexible tension strip connected to the frame and to the lever for supporting the lever, other vertically directed flexible tension strips connected to the lever and to the receivers, and a plurality of check links connected between the frame and each receiver, said check links being disposed some at one elevation and some at another for forming parallelograms to guide the receivers, said lever having the points of attachment of the various flexible tension members disposed such that in end elevation the flexible strips overlap each other less than one quarter of the length of each.

10. In a weighing scale, in combination, a frame, a load receiver, a counterweight receiver, a lever, and a plurality of check links for each receiver, said check links being connected to the frame and the receiver and disposed in differing elevations to form a parallelogram for guiding the receivers, said lever having a virtual pivot plane, a first generally vertical flexible member connected between the frame and lever for supporting the lever, said virtual pivot plane intersecting the flexible member near an end thereof, other generally vertical flexible members connected between the lever and the receivers for supporting the receivers, said virtual pivot plane intersecting said other flexible members near an end of each such that the major portion of the first flexible member is on the opposite side of the pivot plane from the major portion of the other flexible members.

11. In a weighing scale, in combination, a frame, a lever, a load receiver, a counterweight receiver, a plurality of check links arranged in parallel relation to the lever and at various elevations and having flexible end portions attached to the frame and receivers for guiding the receivers, a generally vertical flexible strip attached to the lever and the frame for supporting the lever, a rigid member and a cooperating surface mounted from the frame and lever for limiting movement of the lever tending to buckle the strip, other vertical flexible strips connecting the lever and the receivers for supporting the receivers, and cooperating stops mounted on the lever and receivers for limiting upward movement of the receivers relative to the lever.

12. In a weighing scale, in combination, a frame, a load receiver, a counterweight receiver, a lever, at least two check links at different elevations for connecting each receiver to the frame, vertically positioned strips for supporting the lever from the frame and the receivers from the lever, a U-shaped spring, means on each receiver for supporting an end of the spring, a socket on the spring, a resilient bushing in the socket, and an indicator set in the bushing, said resilient bushing serving to limit the force applied to the indicator upon a sudden application of load to the scale.

13. In a weighing scale, in combination, a frame, a lever, a load receiver, a counterweight receiver, at least two check links at different elevations for guiding each receiver, means for supporting each receiver from the lever, an end on the lever that is adjacent a portion of the frame, a U-shaped spring having a first end attached to the frame portion and a second end attached to the lever end, a socket on the spring, an indicator, and resilient means for mounting the indicator in the socket.

14. A weighing scale according to claim 13 in which means on the lever end and on the frame portion are arranged to selectively mount the U-shaped spring in a plurality of positions.

MARK A. WECKERLY.

REFERENCES CITED

The following references are of record in the file of this patent:

UNITED STATES PATENTS

| Number | Name | Date |
|---|---|---|
| 299,757 | DuBrul | June 3, 1884 |
| 1,703,406 | Schaper | Feb. 26, 1929 |
| 1,896,301 | Gilbert | Feb. 7, 1933 |
| 2,305,731 | Palmgren | Dec. 22, 1942 |